United States Patent
Croak et al.

(10) Patent No.: US 8,107,459 B1
(45) Date of Patent: Jan. 31, 2012

(54) METHOD AND APPARATUS FOR EXECUTING A CALL BLOCKING FUNCTION

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1111 days.

(21) Appl. No.: 11/263,277

(22) Filed: Oct. 31, 2005

(51) Int. Cl.
*H04L 12/66* (2006.01)

(52) U.S. Cl. ...................................... 370/352
(58) Field of Classification Search ........... 370/352–356
See application file for complete search history.

(56) References Cited

U.S. PATENT DOCUMENTS

| | | | |
|---|---|---|---|
| 5,109,408 A * | 4/1992 | Greenspan et al. | 379/197 |
| 5,394,463 A * | 2/1995 | Fischell et al. | 379/211.02 |
| 5,864,610 A * | 1/1999 | Ronen | 379/121.01 |
| 6,085,084 A * | 7/2000 | Christmas | 455/411 |
| 6,567,511 B2 * | 5/2003 | Betts et al. | 379/192 |
| 7,209,473 B1 * | 4/2007 | Mohaban et al. | 370/352 |
| 7,302,250 B2 * | 11/2007 | Chin et al. | 455/404.1 |
| 7,545,920 B2 * | 6/2009 | Wilson et al. | 379/112.01 |
| 2002/0186825 A1 * | 12/2002 | Marchand et al. | 379/188 |
| 2005/0043014 A1 * | 2/2005 | Hodge | 455/411 |
| 2008/0304643 A1 * | 12/2008 | Hodge | 379/188 |
| 2009/0046841 A1 * | 2/2009 | Hodge | 379/189 |

* cited by examiner

*Primary Examiner* — Davetta W Goins
*Assistant Examiner* — Mohammad Islam

(57) ABSTRACT

A method and apparatus for executing a call blocking function in a communications network is described. In one embodiment, monitoring data is received from at least one network component in the communications network. The monitoring data is then analyzed to determine a fraudulent index that is associated with at least one endpoint device number. In the event the fraudulent index exceeds a predefined threshold level, a call blocking function is executed on the at least one endpoint device number.

12 Claims, 4 Drawing Sheets

METHOD AND APPARATUS FOR EXECUTING A CALL BLOCKING FUNCTION

BACKGROUND OF THE INVENTION

1. Field of the Invention

Embodiments of the present invention generally relate to telecommunications systems and, more particularly, to a method and apparatus for executing call blocking functions in a communications network, such as a packet network, e.g., a Voice over internet protocol (VoIP) network.

2. Description of the Related Art

Service providers utilizing a VoIP network can experience fraud since illegal activity is becoming more prevalent in the telephony industry. Namely, some fraudulent activities involve establishing several 1-800 or other tool free numbers that are call forwarded to an international or 1-900 number. Consequently, the caller is automatically billed for these calls. For example, high volume of calls forwarded to a 1-900 number (or any other number that charges the caller for the duration of the call) may be suspect and can be detected by the network provider. Thus, there is a need in the art for a method and apparatus for executing call blocking functions.

SUMMARY OF THE INVENTION

In one embodiment, a method and apparatus for executing a call blocking function in a communications network is described. More specifically, monitoring data is received from at least one network component in the communications network. The monitoring data is then analyzed to determine a fraudulent index that is associated with at least one endpoint device number. In the event the fraudulent index exceeds a predefined threshold level, a call blocking function is executed on the at least one endpoint device number.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
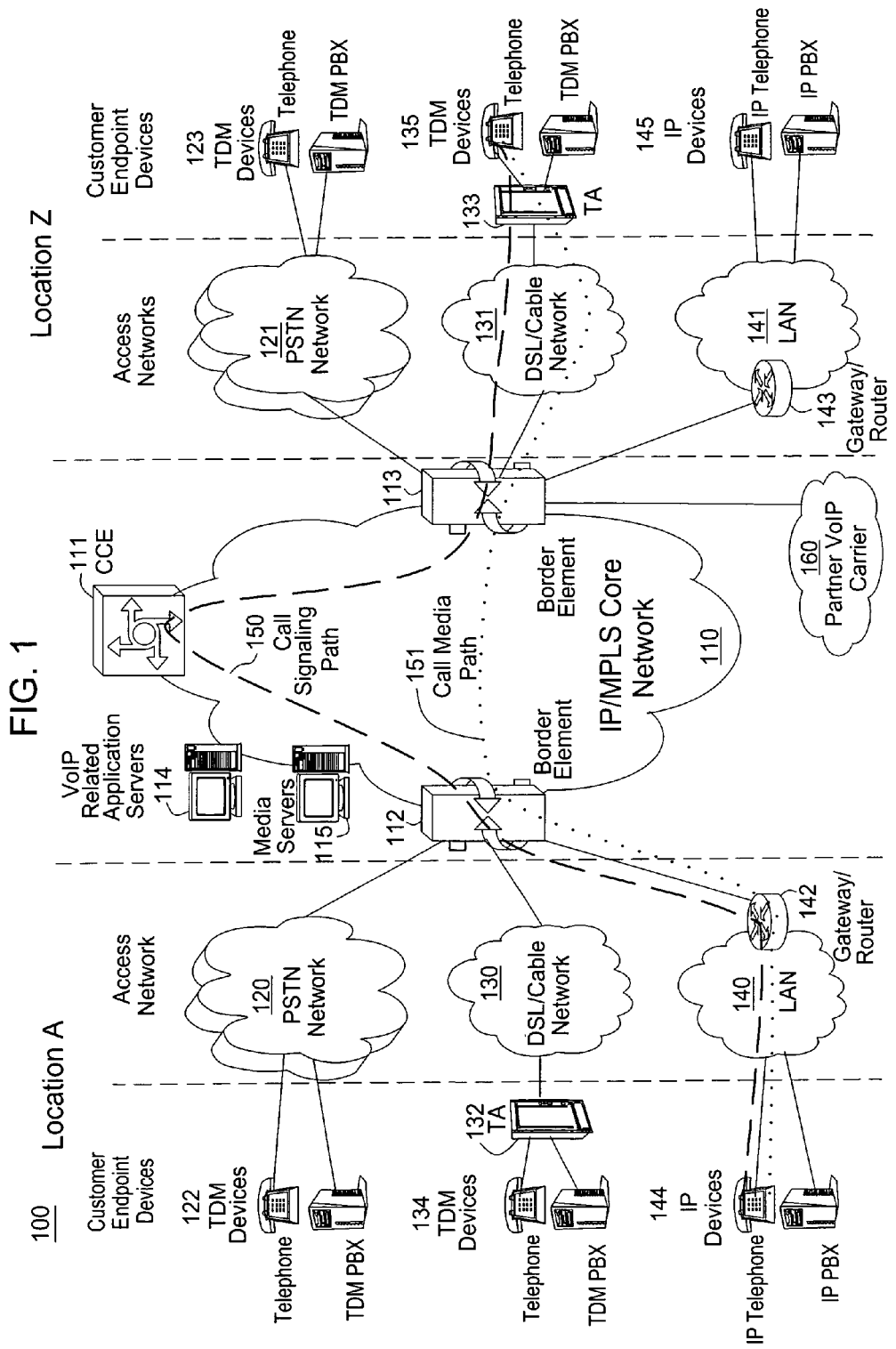
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
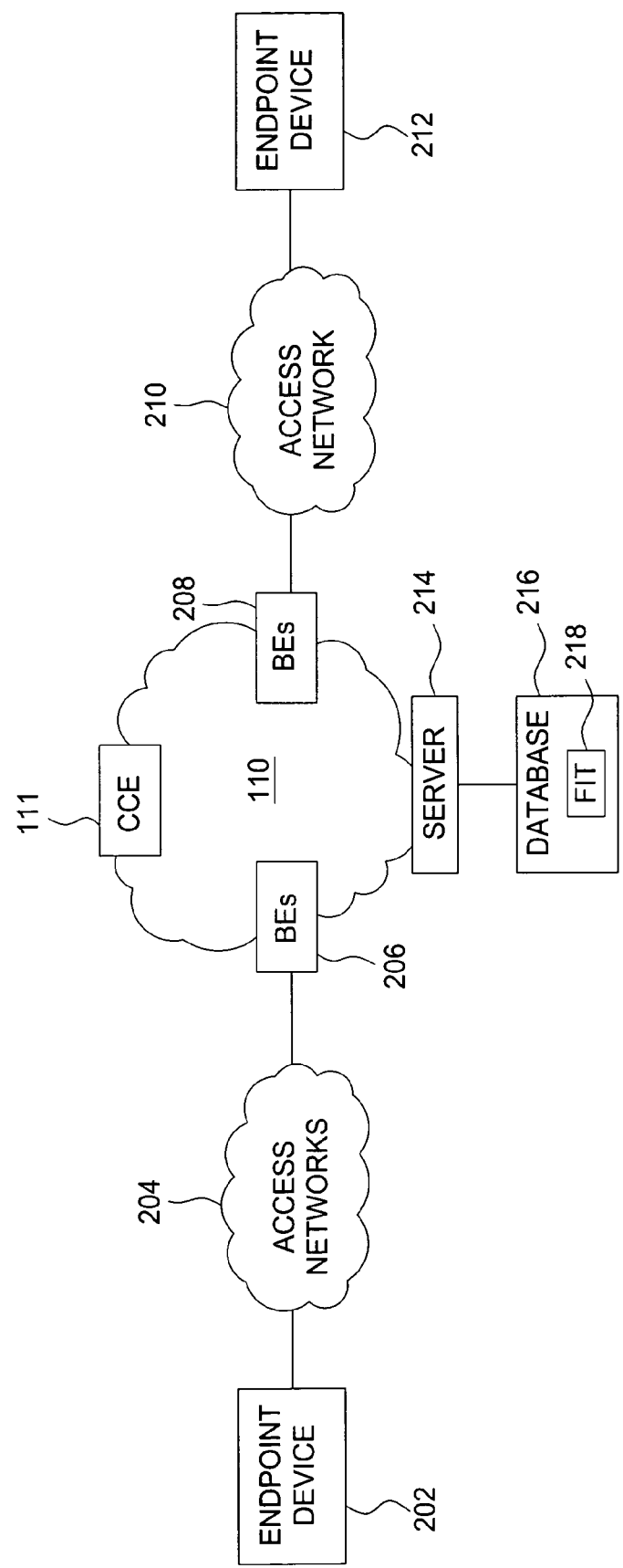
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and one or more border elements (BEs) 206. An endpoint device 212 is configured for communication with the core network 110 via an access network 210 and one or more BEs 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc.).

The core network 110 further includes a server 214 coupled to a database 216. In one embodiment of the present invention, the server 214 comprises a dedicated application server that is configured to collect monitoring data, such as call detail records (CDRs), from the network elements in the core network 110 (e.g., the BEs 206, the BEs 208, the CCE 111). Notably, various network elements in the core network 110 continuously generate CDRs and other monitoring data for every call processed within the network. A CDR is data associated with a telephone call, including the originating telephone number, the dialed telephone number, the date and timestamp, the duration, the call setup delay, the final handling code of the telephone call, and like. The final handling code is the code that indicates whether a call has been completed successfully, blocked, cut-off, or the like. In one embodiment, a call processed by the core network 110 creates at least one CDR at each network element that is involved in the call (e.g., on a per call basis). As such, if multiple network elements are involved in the call, multiple CDRs are created for the call. A CDR created at BEs 206 and 208 for a particular call contains signaling and media information more related to the edge of the core network 110, whereas a CDR created by the CCE 111 for the same call contains signaling and media information more related to the core of the network 110. The database 216 may be any type of electronic collection of data that is well known in the art. In one embodiment, the database 216 may contain at least one fraud index table 218.

In one embodiment, the server 214 may request and receive CDRs from the network elements, such as the BEs 206, the BEs 208, and the CCE 111. In another embodiment, the network elements may forward CDRs to the server 214. In either embodiment, the server 214 is configured to process the monitoring data (e.g., CDRs) in order to detect predictive triggers of fraudulent behavior associated with a particular phone number.

In one embodiment of the present invention, the server 214 monitors for predictive triggers of fraudulent behavior which is becoming more prevalent in the telephony industry. More specifically, the server 214 receives monitoring data, such as CDRs, that is provided by the network components. This monitoring data may indicate a call flow increase to numbers located near areas that are traditionally known for telephony fraud (i.e., a predictive trigger of fraudulent behavior). In one embodiment, the server 214 compares the acquired monitoring information with certain data tables (e.g., fraud index tables), which indicate thresholds relating to the number of calls, the time period of increased calling activity, the origin and destination of the calls, the endpoint device number dialed and the like, that may be used to determine whether fraudulent activity at a particular location or endpoint device is likely. For example, if the number of calls to a particular number during a predefined time period (e.g., a fraudulent index of 1000 calls per minute) exceeds a predefined fraud threshold level (which is adjustable by the network provider), (e.g., 950 calls per minute) then the server 214 may perform a variety of actions. Notably, the server 214 may be configured to notify border elements 206 and 208 to block any call forwarding to destinations associated with an exceeded fraud threshold level. For example, the invention provides network based call forwarding blocks to specific international destinations. In the event there is a valid reason for forwarding calls to these destination numbers of suspected origin, users may invoke the assistance of an operator or customer care support to override the blocks (on a per subscriber basis).

Figure 3:
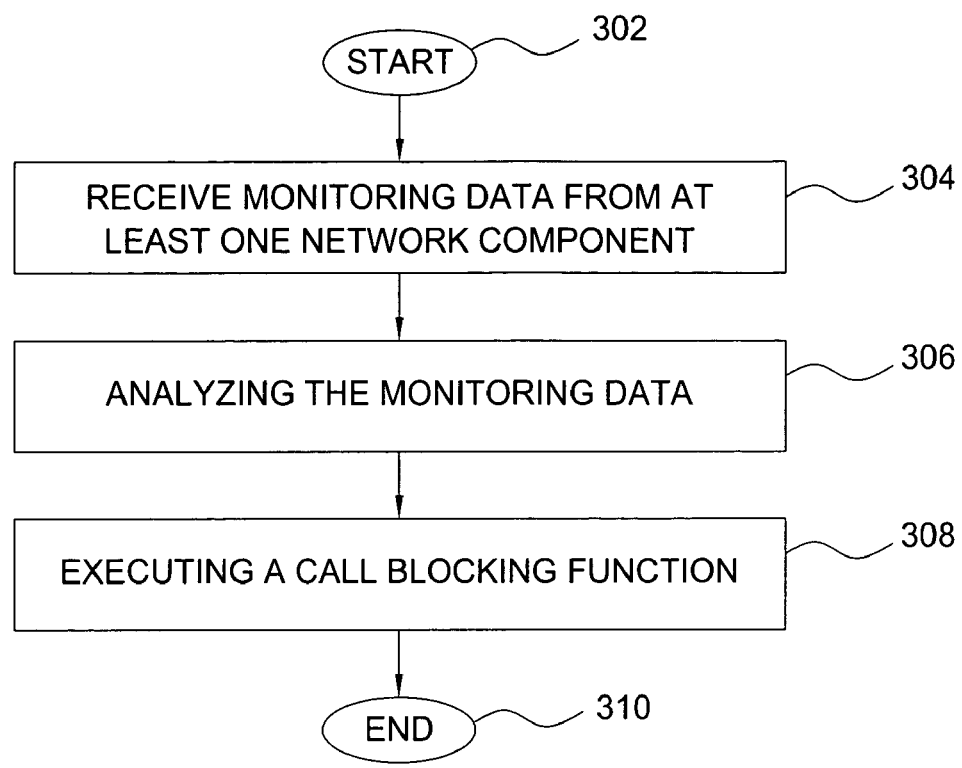
FIG. 3 is a flow diagram depicting an exemplary embodiment of a method for executing call blocking functions in accordance with one or more aspects of the invention.

FIG. 3 is a flow diagram depicting an exemplary embodiment of a method 300 for executing call blocking call functions in a communications network as related to one or more aspects of the invention. The method 300 begins at step 302 and proceeds to step 304 where monitoring data is received from at least one network component. In one embodiment, call detail record (CDR) data is received by the server 214 from the network components in the core network.

At step 306, the monitoring data is analyzed to determine if a predefined level of fraudulent activity is associated with at least one endpoint device number. In one embodiment, the server 214 processes the monitoring data (e.g., CDRs) in an attempt to detect any predictive triggers of fraudulent behavior corresponding to a phone number. For instance, the server 214 may process the monitoring data to ascertain a fraudulent index number associated with the phone number and contrast it with a fraud threshold level (stored in the database 218) in order to predict if a predefined level of fraudulent activity is present.

At step 308, a call blocking function is executed on the at least one endpoint device number if the monitoring data indicates possible fraudulent activities. In one embodiment, the server 214 implements a call blocking function on the phone number exhibiting an unacceptable level of suspected fraudulent activity. For example, a call blocking function may be applied to a 1-900 number or any other number that charges the caller for the duration of the call. The method 300 continues to step 310 and ends.

Figure 4:
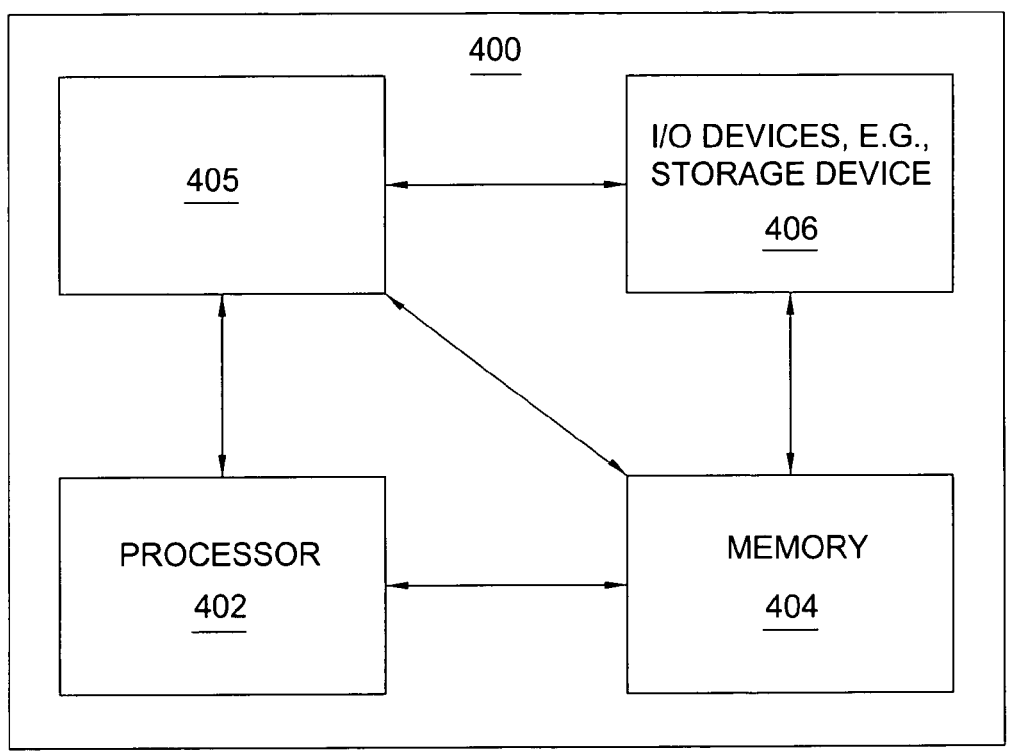
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for executing call blocking functions, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for executing call blocking functions can be loaded into memory 404 and executed by processor 402 to implement the functions as discussed above. As such, the present process 405 for executing call blocking functions (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for executing a call blocking function in a communications network, comprising:
    receiving monitoring data from a plurality of network components in the communications network, wherein the monitoring data comprises call detail records;
    analyzing the monitoring data to determine a fraudulent index associated with a destination telephone number, wherein the fraudulent index is representative of a likelihood of fraudulent activity for a predefined time period, wherein the destination telephone number comprises a number that causes a caller to be charged for a duration of a call when the number is called; and
    executing the call blocking function on the destination telephone number if the fraudulent index exceeds a predefined threshold level.

2. The method of claim 1, wherein the communications network comprises an internet protocol network.

3. The method of claim 2, wherein the internet protocol network comprises a service over internet protocol network.

4. The method of claim 1, wherein the analyzing comprises:
    determining whether a fraud value for the fraudulent index obtained from the monitoring data exceeds the predefined threshold level.

5. An apparatus for executing a call blocking function in a communications network, comprising:
    an application server configured to:
        receive monitoring data from a plurality of network components in the communications network, wherein the monitoring data comprises call detail records;
        analyze the monitoring data to determine a fraudulent index associated with a destination telephone number, wherein the fraudulent index is representative of a likelihood of fraudulent activity for a predefined time period, wherein the destination telephone number comprises a number that causes a caller to be charged for a duration of a call when the number is called; and
        execute the call blocking function on the destination telephone number if the fraudulent index exceeds a predefined threshold level.

6. The apparatus of claim 5, wherein the communications network comprises an internet protocol network.

7. The apparatus of claim 6, wherein the internet protocol network comprises a service over internet protocol network.

8. The apparatus of claim 5, wherein the application server is configured to analyze the monitoring data by determining whether a fraud value for the fraudulent index obtained from the monitoring data exceeds the predefined threshold level.

9. A computer readable medium having stored thereon a plurality of instructions, the plurality of instructions including instructions which, when executed by a processor, causes the processor to perform a method for executing a call blocking function in a communications network, comprising:
    receiving monitoring data from a plurality of network components in the communications network;
    analyzing the monitoring data to determine a fraudulent index associated with a destination telephone number, wherein the fraudulent index is representative of a likelihood of fraudulent activity for a predefined time period, wherein the destination telephone number comprises a number that causes a caller to be charged for a duration of a call when the number is called; and
    executing the call blocking function on the destination telephone number if the fraudulent index exceeds a predefined threshold level.

10. The computer readable medium of claim 9, wherein the communications network comprises an internet protocol network.

11. The computer readable medium of claim 10, wherein the internet protocol network comprises a service over internet protocol network.

12. The computer readable medium of claim 9, wherein the analyzing comprises:
    determining whether a fraud value for the fraudulent index obtained from the monitoring data exceeds the predefined threshold level.

* * * * *